(No Model.)
R. WHITE.
SUPPORT FOR SPINNING SPINDLES.
No. 446,999. Patented Feb. 24, 1891.
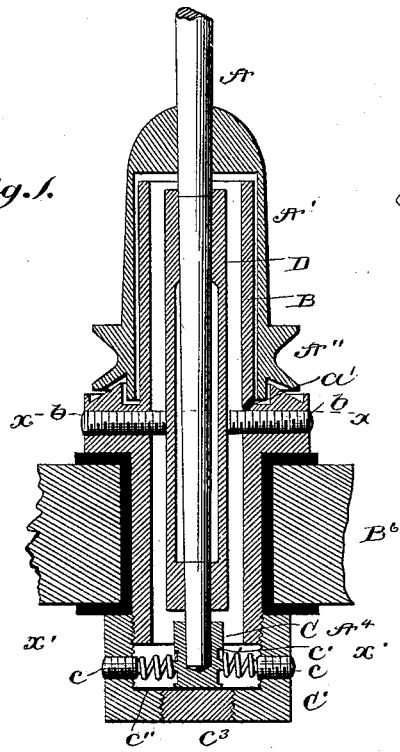
Fig. 1.
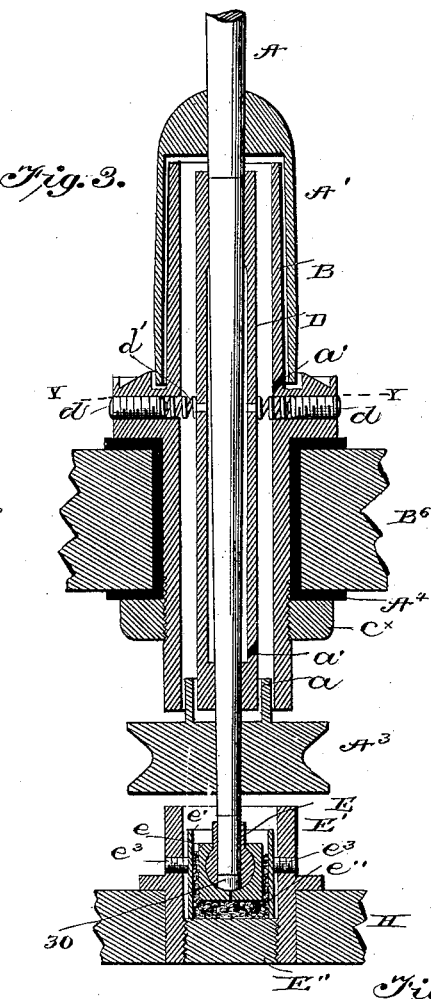
Fig. 3.
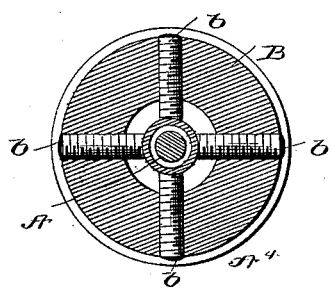
Fig. 2.
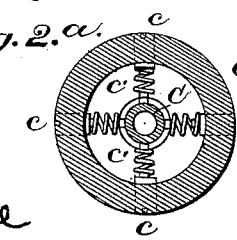
Fig. 2.a
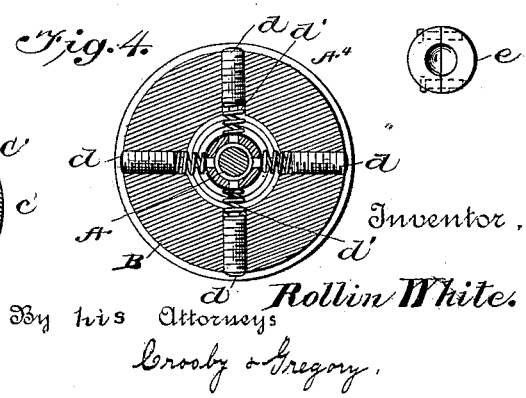
Fig. 4. Fig. 5.
Witnesses
John Thirie
John L. Edwards,
Inventor,
Rollin White.
By his Attorneys
Crosby & Gregory.

United States Patent Office.

ROLLIN WHITE, OF LOWELL, ASSIGNOR TO WILLIAM F. DRAPER, OF HOPEDALE, MASSACHUSETTS.

SUPPORT FOR SPINNING-SPINDLES.

SPECIFICATION forming part of Letters Patent No. 446,999, dated February 24, 1891.

Application filed May 12, 1888. Serial No. 273,745. (No model.)

*To all whom it may concern:*

Be it known that I, ROLLIN WHITE, a citizen of the United States, residing at Lowell, in the county of Middlesex and Commonwealth of Massachusetts, have invented a certain new and useful Improvement in Supports for Spinning-Spindles, of which the following is a description.

This invention has for its object to improve that class of supports or bearings for spindles of spinning-machines which in the rotation of the spindle are permitted to move laterally, so that the spindle can adjust itself to the changing center of gravity caused by variations in the load carried by the spindle.

My invention consists, essentially, of a spindle having an attached sleeve, an outside supporting case or shell surrounded by the sleeve and adapted to be mounted on a rail, a lateral bearing for that part of the spindle within the whirl, an independent lateral bearing for the spindle near its lower extremity and radially-arranged adjusting-screws to adjust both said bearings laterally with the spindle, combined with a series of springs arranged between some of the said adjustable screws and one of the said lateral bearings to operate substantially as will be described.

Figure 1 in section shows one form of my improved spindle-support together with part of a bolster-rail, the spindle being, however, in elevation. Fig. 2 is a cross-section of the construction shown in Fig. 1 at a point just above the rail, the screws $b$ being shown in elevation. Fig. $2^a$ is a section in the line $x'$, Fig. 1. Fig. 3 is a partial section and elevation of a modified construction embodying my invention. Fig. 4 is a cross-section just above the rail in Fig. 3, the screws $d$ being shown in elevation. Fig. 5 is a top view of the supporting-block $e$.

A represents a spindle, which may be of usual form, it having a sleeve to surround the outer casing or shell B, the said sleeve in Fig. 1 having attached to it a whirl $A''$; but in the modification Fig. 3 the whirl marked $A^3$ is connected to the spindle. The stationary outer casing or support B is extended through a hole in the rail $B^6$, and is held in place in Fig. 1 by a nut $C'$, the nut shown in Fig. 3 being designated $C^x$. I have shown a packing $A^4$ interposed between the said casing or support and the rail.

In both modifications of my invention are two lateral bearings.

Referring to Figs. 1 and 2, D represents one lateral bearing, it being extended into the sleeve $A'$, the other lateral bearing C independent of the lateral bearing D and surrounding the lower extremity of the spindle. In Fig. 1 the bearing D is acted upon and adjusted with relation to the supporting-case B by the radially-arranged screws $b$ and the lateral bearing C, which is seated preferably upon a packing $c''$ in the nut $C'$, has bearing against it a series of radially-arranged springs $c'$, acted upon by adjusting-screws $c$, the rotation of which in one or the other direction makes the said springs more or less stiff, as may be desired, according to the work to be done by the spindle.

In the modification shown in Fig. 3, the lateral bearing which is extended within the sleeve of the spindle is marked D, while the lateral bearing for the lower end of the spindle is marked E. This lateral bearing forms a part of the step-bearing, and it rests in a block $e$ (see Figs. 3 and 5) placed within a shell $e'$, packing $e''$ being placed between the block and shell, the shell being set within a casing $E'$, resting upon the lower rail H, the casing carrying adjusting-screws $e^3$, which by their rotation in one or the other direction may adjust the shell $e'$. The block $e$ is made in two parts secured together after the bearing E has been placed therein by screws, as shown in Fig. 5, the said bearing placed therein loosely permitting the foot of the spindle to tip a little, as may be desired. The two parts of the block are hollowed out to loosely embrace the spherical portion of the bearing, as best shown in Fig. 3. The lateral bearing D is acted upon by radially-arranged spiral springs $d'$, made adjustable by means of screws $d$. The tubular lateral bearing E contains a small step piece or washer 30, on which the lower end of the spindle rests its weight, the step-piece bearing with its convex lower end on the block $e$.

I claim—

The spindle having an attached sleeve, an outside supporting case or shell surrounded by the sleeve and adapted to be mounted on a rail, a lateral bearing for that part of the spindle within the sleeve, and an independent lateral bearing for the spindle near its lower extremity, and radially-arranged adjusting-screws to adjust both said bearings laterally with the spindle, combined with a series of springs arranged between some of the said adjustable screws and one of the said lateral bearings, to operate substantially as described.

ROLLIN WHITE.

Witnesses:
E. L. WHITE,
HERBERT R. WHITE.